US007762365B2

(12) United States Patent
Iwanaka et al.

(10) Patent No.: US 7,762,365 B2
(45) Date of Patent: *Jul. 27, 2010

(54) ELECTRIC VEHICLE DRIVE CONTROL DEVICE AND CONTROL METHOD THEREFOR

(75) Inventors: Makoto Iwanaka, Anjo (JP); Shigeki Takami, Anjo (JP); Ryuji Ibaraki, Nishikamo-gun (JP); Tooru Matsubara, Toyota (JP); Hiroyuki Shibata, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 819 days.

This patent is subject to a terminal disclaimer.

(21) Appl. No.: 11/586,591

(22) Filed: Oct. 26, 2006

(65) Prior Publication Data

US 2007/0107961 A1     May 17, 2007

(30) Foreign Application Priority Data

Oct. 26, 2005   (JP)   .............................. 2005-311610

(51) Int. Cl.
*B60K 6/42* (2007.10)
(52) U.S. Cl. ..................... 180/65.22; 318/432; 477/107
(58) Field of Classification Search .............. 180/65.22, 180/65.235, 65.26, 65.265, 65.285, 65.31, 180/65.6, 65.7; 903/909, 910, 912, 915, 903/917, 918, 919, 930, 945; 477/2, 3, 4, 477/5, 6, 7
See application file for complete search history.

(56) References Cited

U.S. PATENT DOCUMENTS 5,823,281 A * 10/1998 Yamaguchi et al. .... 180/65.235
5,944,630 A * 8/1999 Omote ........................... 477/5
6,159,127 A * 12/2000 Loeffler et al. ................. 477/5
6,299,563 B1 * 10/2001 Shimasaki ..................... 477/5
6,554,736 B2 * 4/2003 Takano et al. .................. 477/5
6,722,230 B2 * 4/2004 Sakamoto et al. ............. 74/661
6,932,176 B2 * 8/2005 Takami et al. .......... 180/65.235
6,976,934 B2 * 12/2005 Komeda et al. ................ 477/5

(Continued)

FOREIGN PATENT DOCUMENTS

JP       A-51-49364       4/1976

(Continued)

*Primary Examiner*—Paul N Dickson
*Assistant Examiner*—Brodie Follman
(74) *Attorney, Agent, or Firm*—Oliff & Berridge, PLC (57) ABSTRACT

An electric vehicle drive control device that includes a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; a transmission for shifting that shifts a speed of a rotation transferred to from the transmission shaft; and a controller that: controls electric motor control processing means for controlling a rotation speed of the first electric motor in conjunction with shifting performed by the transmission; and adjusts electric power adjustment processing means for adjusting an electric power consumptions generated in the first and second electric motors, by controlling an output supplied to the second electric motor in conjunction with the control of the rotation speed of the first electric motor.

14 Claims, 6 Drawing Sheets

U.S. PATENT DOCUMENTS

| | | | |
|---|---|---|---|
| 7,228,926 B2 * | 6/2007 | Takami et al. | 180/65.265 |
| 7,367,917 B2 * | 5/2008 | Sakamoto et al. | 477/5 |
| 7,572,201 B2 * | 8/2009 | Supina et al. | 475/5 |
| 2003/0045389 A1 * | 3/2003 | Kima | 475/5 |
| 2003/0078134 A1 * | 4/2003 | Kojima et al. | 477/3 |
| 2004/0044458 A1 * | 3/2004 | Kadota | 701/55 |
| 2004/0134697 A1 * | 7/2004 | Kobayashi et al. | 180/65.2 |
| 2004/0147365 A1 * | 7/2004 | Komeda et al. | 477/6 |
| 2005/0029023 A1 * | 2/2005 | Takami et al. | 180/65.3 |
| 2005/0209760 A1 | 9/2005 | Tabata et al. | |
| 2005/0283283 A1 * | 12/2005 | Hisada et al. | 701/22 |
| 2006/0003863 A1 * | 1/2006 | Tabata et al. | 477/2 |
| 2007/0103106 A1 * | 5/2007 | Iwanaka et al. | 318/432 |
| 2009/0227407 A1 * | 9/2009 | Kamada et al. | 475/5 |
| 2009/0229393 A1 * | 9/2009 | Shibata et al. | 74/335 |
| 2009/0248265 A1 * | 10/2009 | Tabata et al. | 701/59 |
| 2009/0291801 A1 * | 11/2009 | Matsubara et al. | 477/5 |
| 2009/0305832 A1 * | 12/2009 | Matsubara et al. | 475/150 |

FOREIGN PATENT DOCUMENTS

| | | |
|---|---|---|
| JP | A-9-331603 | 12/1997 |
| JP | A-2000-2327 | 1/2000 |
| JP | A-2003-127681 | 5/2003 |
| JP | A-2004-15982 | 1/2004 |
| JP | A-2004-217096 | 8/2004 |
| JP | A-2005-61498 | 3/2005 |
| JP | A-2005-061498 | 3/2005 |
| JP | A-2005-256883 | 9/2005 |

\* cited by examiner

|  | C0 | C1 | C2 | B1 | B2 | F1 |
|---|---|---|---|---|---|---|
| 1ST |  | ○ |  |  | (○) | ○ |
| 2ND |  | ○ |  | ○ |  |  |
| 3RD | ○ | ○ |  |  |  |  |
| 4TH | ○ |  |  | ○ |  |  |
| REV |  |  | ○ |  | ○ |  |

ELECTRIC VEHICLE DRIVE CONTROL DEVICE AND CONTROL METHOD THEREFOR

INCORPORATION BY REFERENCE

The disclosure of Japanese Patent Application No. 2005-311610 filed on Oct. 26, 2005 including the specification, drawings and abstract is incorporated herein by reference in its entirety.

BACKGROUND

The present invention relates to an electric vehicle drive control device and a control method therefor.

There exists a vehicle driving apparatus that is installed in an electric vehicle such as a hybrid vehicle. In the vehicle driving apparatus, a planetary gear unit with a sun gear, a ring gear and a carrier transfers a part of the engine torque to a generator, which serves as a first electric motor, and transfers the rest of the engine torque to driven wheels. The carrier is connected to the engine and the ring gear and a motor, which serves as a second electric motor, are connected to the driven wheels via a transmission. Also, the sun gear is connected to the generator. Accordingly, the rotation output from the ring gear and the motor is transferred to the driven wheels so that a driving force is generated.

During a running of the hybrid vehicle, while the engine is driven and an engine torque is generated such that the engine torque is transferred to the driven wheels via the transmission, if an engine rotation speed changes before and after shifting is performed by the transmission, a shift shock will occur. To cope with this problem, a generator rotation speed is controlled such that the change in the engine rotation speed is suppressed before and after shifting. (For example, Japanese Patent Application Publication No. JP-A-2005-61498)

SUMMARY

However, in the conventional vehicle driving apparatus, the balance of electric power between the generator and the motor may be upset, resulting in worsened fuel efficiency.

The present invention thus provides, among other things, an electric vehicle drive control device and a control method therefor that solve the problems with the conventional vehicle driving apparatus and are capable of maintaining a balance of electric power between a first electric motor and a second electric motor, and are also capable of improving a fuel efficiency of an electric vehicle.

According to a first exemplary aspect of the invention, an electric vehicle drive control device that includes a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; a transmission for shifting that shifts a speed of a rotation transferred to from the transmission shaft; and a controller that: controls electric motor control processing means for controlling a rotation speed of the first electric motor in conjunction with shifting performed by the transmission; and adjusts electric power adjustment processing means for adjusting an electric power consumptions generated in the first and second electric motors, by controlling an output supplied to the second electric motor in conjunction with the control of the rotation speed of the first electric motor.

According to a second exemplary aspect of the invention, a control method for an electric vehicle drive control device comprising a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; and a transmission that shifts a speed of a rotation transferred from the transmission shaft, includes controlling a rotation speed of the first electric motor in conjunction with shifting performed by the transmission; and adjusting electric power consumptions generated in the first and second electric motors, by controlling an output supplied to the second electric motor in conjunction with the control of the rotation speed of the first electric motor.

BRIEF DESCRIPTION OF THE DRAWINGS

Various exemplary embodiments of the invention will be described with reference to the drawings, wherein.

DETAILED DESCRIPTION OF EMBODIMENTS

Hereinafter, an embodiment of the present invention will be explained in detail, with reference to the drawings. In the explanation, an electric vehicle drive control device and a control method therefor to drive a hybrid vehicle, which is an electric vehicle, will be described.

Figure 1:
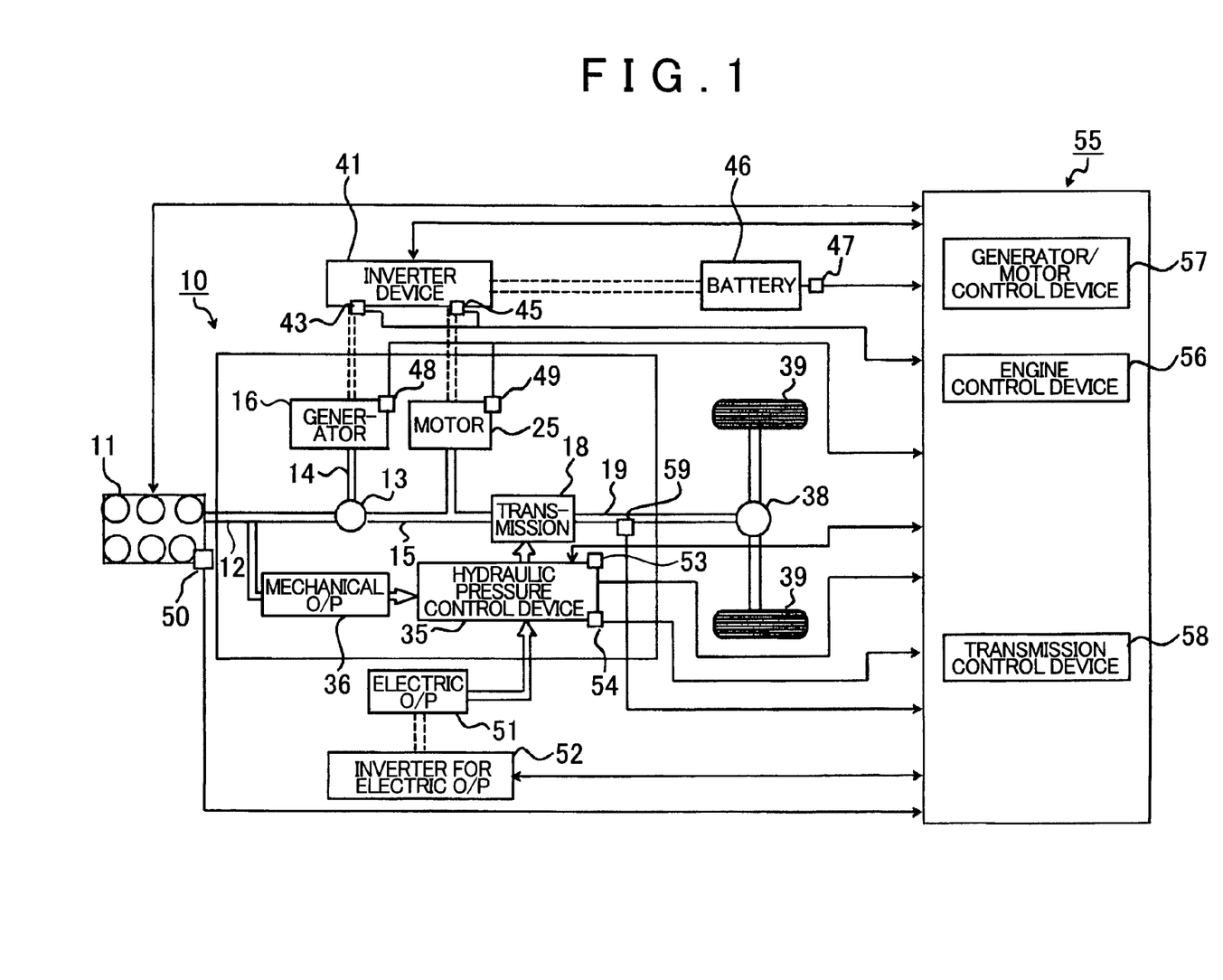
FIG. 1 is a conceptual drawing of a vehicle driving apparatus according to an embodiment of the present invention.

FIG. 1 is a conceptual drawing of a vehicle driving apparatus for a hybrid vehicle according to the embodiment of the present invention.

In the drawing, reference numeral 10 denotes a vehicle driving apparatus, whereas reference numeral 11 denotes an engine (E/G), and reference numeral 12 denotes an output shaft from which a rotation and an engine torque TE that are generated by driving the engine 11 are output. The output shaft 12 also serves as an input shaft for the vehicle driving apparatus 10. In addition, reference numeral 13 denotes a planetary gear unit that serves as an example of a differential device for distributing the engine torque TE input via the output shaft 12. Reference numerals 14 and 15 denote examples of transmission shafts that receive a rotation generated by the planetary gear unit 13 and also receive the engine torque TE distributed by the planetary gear unit 13. Reference numeral 16 denotes a generator (G) that serves as an example of a first electric motor as well as a first electric machine, and is connected to the planetary gear unit 13 via the transmission shaft 14. Reference numeral 25 denotes a motor (M) that serves as an example of a second electric motor as well as a second electric machine, and is connected to the planetary gear unit 13 via the transmission shaft 15.

Reference numeral 18 denotes a transmission that is connected to the planetary gear unit 13 and to the motor 25 via the transmission shaft 15. The transmission 18 shifts the speed of the rotation input via the transmission shaft 15, and outputs the rotation whose speed has been shifted to an output shaft 19.

Figure 4:
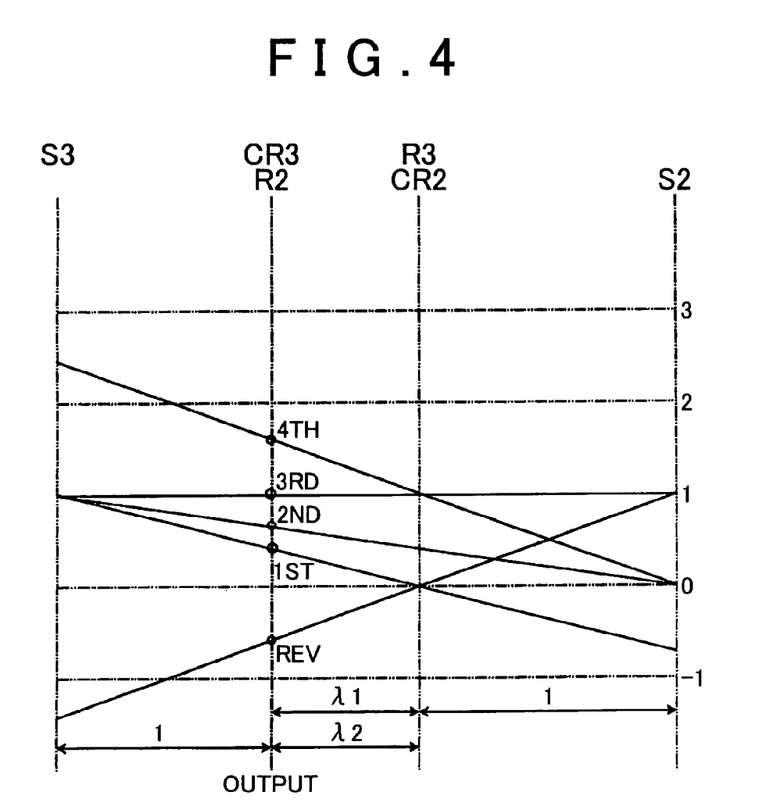
FIG. 4 is a block diagram of an electric vehicle drive control device according to the embodiment of the present invention.

A differential mechanism 38 (FIG. 4) is connected to the output shaft 19. The differential mechanism 38 distributes the rotation transferred via the output shaft 19 and transfers such rotation to driven wheels 39 (FIG. 4). As described here, the engine 11, the generator 16, the motor 25, and the driven wheels 39 are mechanically connected to one another.

The planetary gear unit 13 comprises a single planetary gear and includes a first sun gear S1, a first pinion P1 that meshes with the first sun gear S1, a first ring gear R1 that meshes with the first pinion P1, and a first carrier CR1 that rotatably supports the first pinion P1. The first sun gear S1 is connected to the generator 16 via the transmission shaft 14. The first ring gear R1 is connected to the motor 25 and to the transmission 18 via the transmission shaft 15. The first carrier CR1 is connected to the engine 11 via the output shaft 12. The first sun gear S1, the first ring gear R1, and the first carrier CR1 structure a first differential element. The first sun gear S1 structures a first rotational element. The first ring gear R1 and the first carrier CR1 structure a second rotational element and a third rotational element, respectively.

The generator 16 is fixed to the transmission shaft 14. The generator 16 includes a rotor 21 that is rotatably disposed, a stator 22 that is positioned around the rotor 21, and a coil 23 that is wound around the stator 22. The generator 16 generates alternating electric currents that are in U-phase, V-phase, and W-phase, using the rotation transferred via the transmission shaft 14. Also, the generator 16 generates a torque of the generator 16, i.e., a generator torque TG, as necessary with the U-phase, V-phase, and W-phase electric currents, and outputs the generator torque TG generated to the transmission shaft 14.

A generator brake (not shown) is provided between the rotor 21 and a case Cs of the vehicle driving apparatus 10. By engaging the generator brake, it is possible to make the rotor 21 stationary and to stop the rotation of the generator 16 mechanically.

The motor 25 is fixed to the transmission shaft 15. The motor 25 includes a rotor 26 that is rotatably disposed, a stator 27 that is positioned around the rotor 26, and a coil 28 that is wound around the stator 27. The motor 25 generates a torque of the motor 25, i.e., a motor torque TM, using U-phase, V-phase, and W-phase electric currents that are supplied from a battery (not shown), and outputs the motor torque TM generated to the transmission shaft 15.

The transmission 18 includes a first gear unit 31 and a second gear unit 32, each of which is a single planetary gear. The transmission 18 also includes clutches C0 to C2, brakes B1 and B2, and a one-way clutch F1 that serve as friction engagement elements.

The first gear unit 31 includes a second sun gear S2, a second pinion P2 that meshes with the second sun gear S2, a second ring gear R2 that meshes with the second pinion P2, and a second carrier CR2 that rotatably supports the second pinion P2. The second gear unit 32 includes a third sun gear S3, a third pinion P3 that meshes with the third sun gear S3, a third ring gear R3 that meshes with the third pinion P3, and a third carrier CR3 that rotatably supports the third pinion P3.

The second sun gear S2, the second ring gear R2, and the second carrier CR2 structure a second differential element. The third sun gear S3, the third ring gear R3, and the third carrier CR3 structure a third differential element.

The second sun gear S2 is connected to the transmission shaft 15 via the clutch C2 and is also connected to the case Cs via the brake B1. The second ring gear R2 is connected to the third carrier CR3 and the output shaft 19. The second carrier CR2 is connected to the third ring gear R3 and is also connected to the transmission shaft 15 via the clutch C0. The second carrier CR2 is further connected to the case Cs via the one-way clutch F1 and the brake B2. The third sun gear S3 is connected to the transmission shaft 15 via the clutch C1.

Next, the operation of the transmission 18 will be explained.

Figure 2:
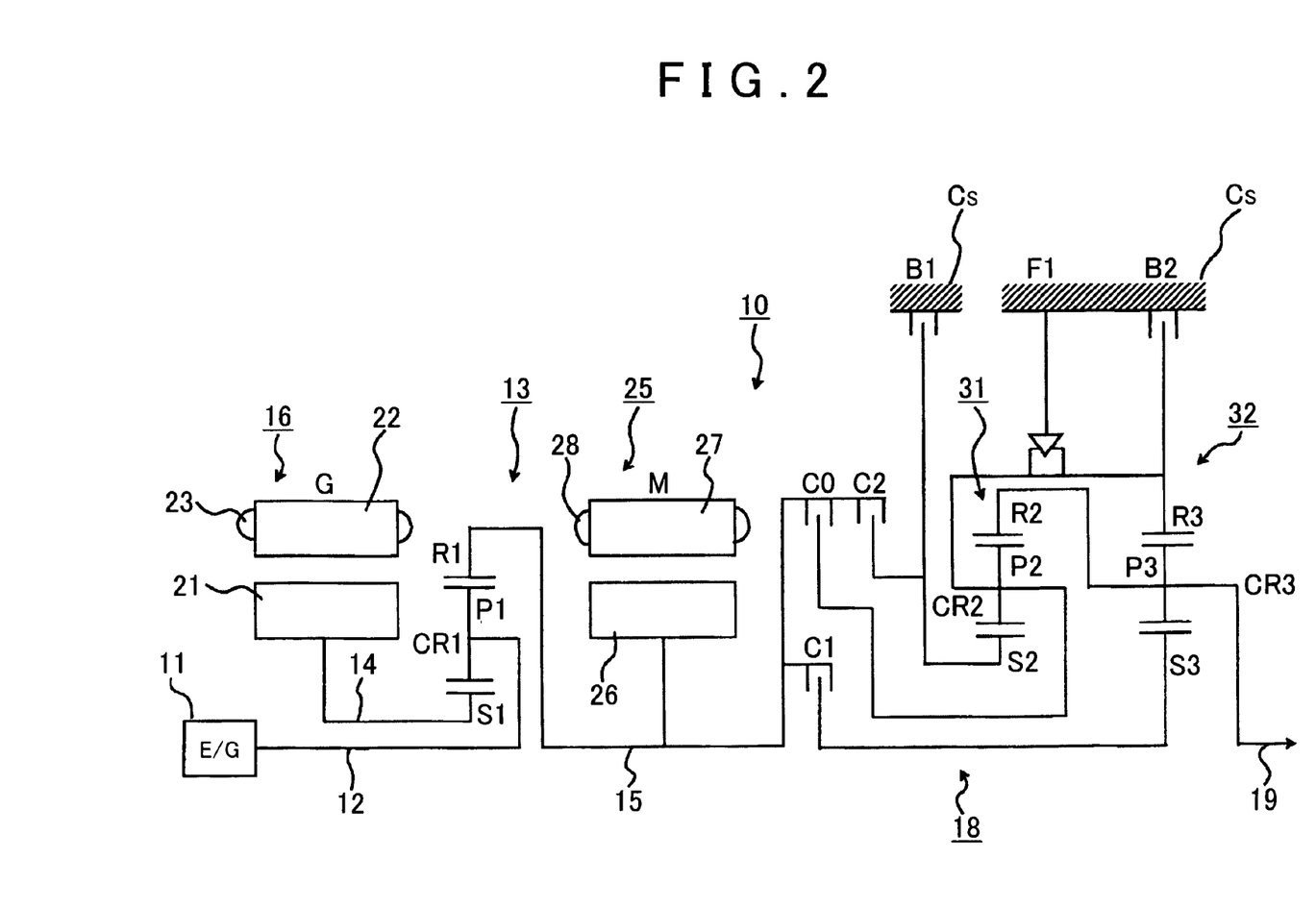
FIG. 2 is a drawing of an operation table for a transmission according to the embodiment of the present invention.
Figure 3:
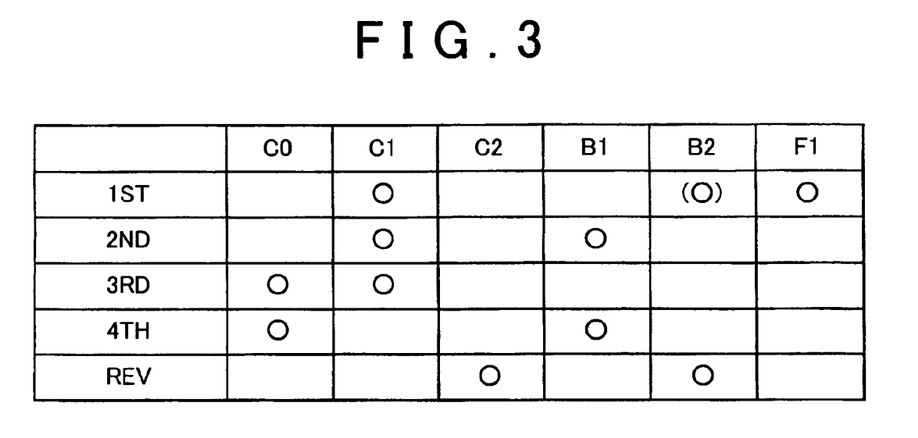
FIG. 3 is a velocity diagram for the transmission according to the embodiment of the present invention.

FIG. 2 is a drawing of an operation table for the transmission according to the embodiment of the present invention. FIG. 3 is a velocity diagram for the transmission according to the embodiment of the present invention.

In the drawings, reference characters C0 to C2 denote the clutches and reference characters B1 and B2 denote the brakes. Reference character F1 denotes the one-way clutch. Reference characters 1ST, 2ND, 3RD, and 4TH denote first to fourth forward speeds. Reference character REV denotes a gear for driving in reverse. Circles in the table indicate engagement of the clutches C0 to C2 and the brakes B1 and B2, and that the one-way clutch F1 is in a locked state. The circle in parentheses indicates that the brake B2 is engaged when an engine brake is used. Blank areas in the table indicate release of the clutches C0 to C2 and the brakes B1 and B2, and that the one-way clutch F1 is in a free state.

Reference character S2 denotes the second sun gear, and reference character R2 denotes the second ring gear. Reference character CR2 denotes the second carrier, S3 denotes the third sun gear, R3 denotes the third ring gear, and CR3 denotes the third carrier.

Reference character λ1 denotes a ratio of the number of teeth in the second sun gear S2 to the number of teeth in the second ring gear R2, and reference character λ2 denotes a ratio of the number of teeth in the third sun gear S3 to the number of teeth in the third ring gear R3. Numerals −1, 0, 1, 2, and 3 shown in FIG. 3 denote relative rotation speeds when a rotation input to each shaft, i.e., a rotation speed of the rotation shaft, is expressed as 1.

With the transmission 18 structured as described above, at the first forward speed, the clutch C1 is engaged and the one-way clutch F1 is in a locked state. In this situation, due to engagement of the clutch C1, the rotation of the transmission shaft 15 is input to the third sun gear S3, so that the third sun gear S3 is rotated at a rotation speed 1. Meanwhile, due to the locked state of the one-way clutch F1, the rotation speed of the third ring gear R3 is zero (0), so that a rotation reduced to a first-gear speed is output from the third carrier CR3 to the output shaft 19.

At the second forward speed, the clutch C1 and the brake B1 are engaged. In this situation, due to engagement of the clutch C1, the rotation of the transmission shaft 15 is input to the third sun gear S3, so that the third sun gear S3 is rotated at the rotation speed 1. Meanwhile, due to engagement of the brake B1, the rotation speed of the second sun gear S2 is zero, so that a rotation reduced to a second-gear speed, which is higher than the first-gear speed, is output from the third carrier CR3 to the output shaft 19.

At the third forward speed, the clutches C0 and C1 are engaged. In this situation, due to engagement of the clutch C0, the rotation of the transmission shaft 15 is input to the second carrier CR2, so that the second carrier CR2 is rotated at the rotation speed 1. Meanwhile, due to engagement of the clutch C1, the rotation of the transmission shaft 15 is input to the third sun gear S3, so that the third sun gear S3 is rotated at the rotation speed 1. As a result, the transmission 18 is in a state of direct coupling, and thus, rotation at a third-gear speed, which is the same as the rotation speed of the transmission shaft 15, is output from the third carrier CR3 to the output shaft 19.

At the fourth forward speed, the clutch C0 and the brake B1 are engaged. In this situation, due to engagement of the clutch C0, the rotation of the transmission shaft 15 is input to the second carrier CR2, so that the second carrier CR2 is rotated at the rotation speed 1. Meanwhile, due to engagement of the brake B1, the rotation speed of the second sun gear S2 is zero, so that a rotation increased to a fourth-gear speed, which is higher than the rotation speed of the transmission shaft 15, is output from the third carrier CR3 to the output shaft 19.

When the vehicle is driven in reverse, the clutch C2 and the brake B2 are engaged. In this situation, due to engagement of the clutch C2, the rotation of the transmission shaft 15 is input to the second sun gear S2, so that the second sun gear S2 is rotated at the rotation speed 1. Meanwhile, due to engagement of the brake B2, the rotation speed of the third ring gear R3 is zero, so that a rotation in a reverse direction of the rotation of the transmission shaft 15 is output from the third carrier CR3 to the output shaft 19.

Next, the electric vehicle drive control device will be explained.

FIG. 4 is a block diagram of the electric vehicle drive control device according to the embodiment of the present invention.

In the drawing, the reference numeral 10 denotes the vehicle driving apparatus, whereas the reference numeral 11 denotes the engine, and reference numeral 12 denotes the output shaft. The vehicle driving apparatus 10 includes the planetary gear unit 13, the transmission shafts 14 and 15, the generator 16, the motor 25, the transmission 18, the output shaft 19, a hydraulic pressure control device 35, and a pump 36 (a mechanical O/P). The hydraulic pressure control device 35 supplies and drains oil to and from a hydraulic servo (not shown) by which the clutches C0 to C2 and the brakes B1 and B2 in the transmission 18 are engaged and disengaged. The pump 36 is operated by the rotation of the engine 11 and mechanically generates a predetermined hydraulic pressure, which is supplied to the hydraulic pressure control device 35.

A differential mechanism 38 is connected to the output shaft 19. The differential mechanism 38 distributes the rotation transferred via the output shaft 19 and transfers such rotation to driven wheels 39.

Reference numeral 41 denotes an inverter device that includes an inverter for driving the generator 16 and an inverter for driving the motor 25. Reference numeral 43 denotes an electric current sensor that serves as an electric current detecting unit and detects the electric current flowing in the generator 16. Reference numeral 45 denotes an electric current sensor that serves as an electric current detecting unit and detects the electric current flowing in the motor 25. Reference numeral 46 denotes the battery, and reference numeral 47 denotes a battery voltage sensor that serves as a battery voltage detecting unit and detects a battery voltage Vb. Reference numeral 48 denotes a rotation speed sensor that serves as a rotation speed detecting unit and detects the rotation speed of the generator 16, i.e., a generator rotation speed NG. Reference numeral 49 denotes a rotation speed sensor that serves as a rotation speed detecting unit and detects the rotation speed of the motor 25, i.e., a motor rotation speed NM. Reference numeral 50 denotes a rotation speed sensor that serves as a rotation speed detecting unit and detects the rotation speed of the engine 11, i.e., an engine rotation speed NE. Reference numeral 53 denotes a hydraulic pressure sensor that serves as a hydraulic pressure detecting unit and detects the hydraulic pressure in the hydraulic pressure control device 35. Reference numeral 54 denotes an oil temperature sensor that serves as an oil temperature detecting unit and detects the oil temperature in the hydraulic pressure control device 35. Reference numeral 59 is a vehicle speed sensor that serves as a vehicle speed detecting unit and detects a vehicle speed V, based on the rotation speed of the output shaft 19. The engine rotation speed NE, the generator rotation speed NG, and the motor rotation speed NM structure drive state judgment indicators that are respectively used for judging the drive states of the engine 11, the generator 16, and the motor 25. The rotation speed sensors 48 to 50 structure a drive state judgment indicator detecting unit. The vehicle speed V structures a running load of the hybrid vehicle. The vehicle speed sensor 59 serves as a running load detecting unit.

Reference numeral 51 denotes a pump (an electric O/P) that electrically generates a predetermined hydraulic pressure and supplies the generated hydraulic pressure to the hydraulic pressure control device 35. Reference numeral 52 denotes an inverter for the electric O/P that drives the pump 51. Reference numeral 55 denotes a vehicle control device that controls the entire hybrid vehicle; 56 denotes an engine control device that controls the engine 11; 57 denotes a generator/motor control device that controls the generator 16 and the motor 25; and 58 denotes a transmission control device that controls the transmission 18.

The vehicle control device 55 sends an engine control signal to the engine control device 56 so that the engine control device 56 configures the engine 11 to start or stop.

The vehicle control device 55 specifies an engine target rotation speed NE*, which is a target value for the engine rotation speed NE; a generator target torque TG*, which is a target value for the generator torque TG; and a motor target torque TM*, which is a target value for the motor torque TM. The generator/motor control device 57 specifies a generator target rotation speed NG*, which is a target value for the generator rotation speed NG, and a motor torque correction value δTM, which is a correction value for the motor torque TM.

Next, the operation of the electric vehicle control device will be explained.

Figure 5:
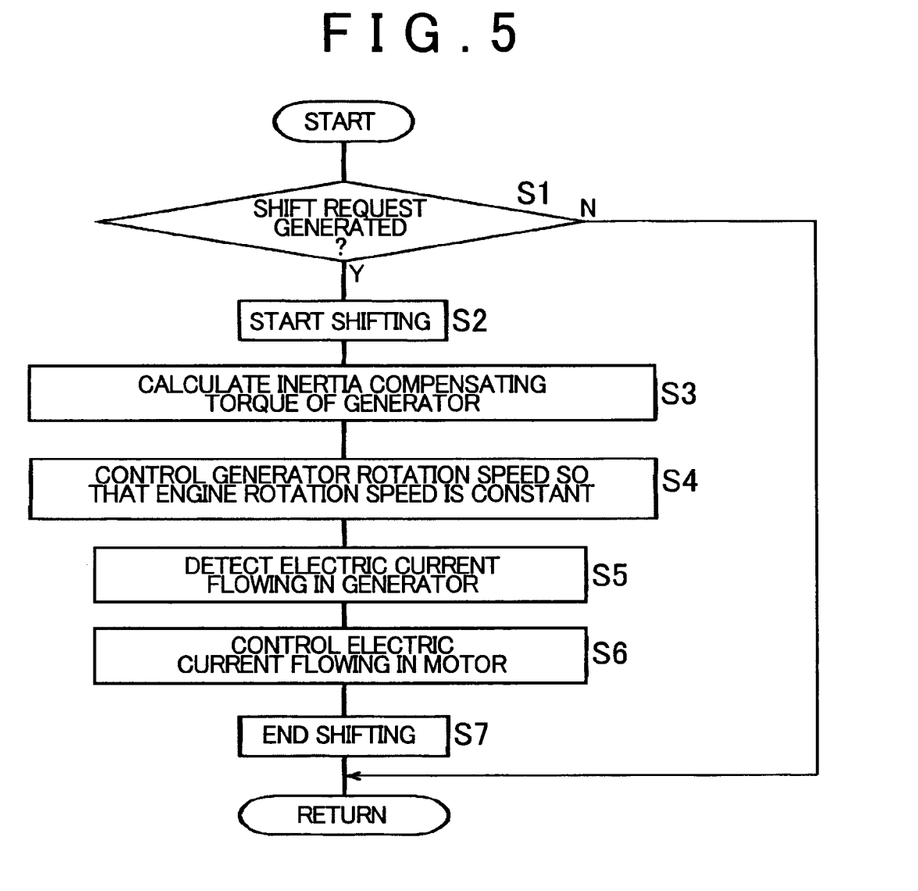
FIG. 5 is a flowchart that shows an operation of the electric vehicle control device according to the embodiment of the present invention.

FIG. 5 is a flowchart that shows an operation of the electric vehicle control device according to the embodiment of the present invention.

Shift speed setting processing means (a shift speed setting processing unit) (not shown) included in the transmission control device 58 performs shift speed setting processing. The shift speed setting processing means reads an acceleration opening degree Ac, which expresses the engine load detected based on the amount by which an accelerator pedal (not shown) is pressed down, and also reads the vehicle speed V and the like. The shift speed setting processing means then specifies a shift speed by referring to a shift map in a recording device (not shown) that is included in the transmission control device 58. Subsequently, shift request processing means (a shift request processing unit) (not shown) included in the transmission control device 58 performs shift request processing. The shift request processing means judges whether shifting is necessary based on the specified shift speed. If it is judged that shifting is necessary, the shift request processing means generates a shift request. Shift processing means (a shift processing unit) (not shown) included in the transmission control device 58 performs shift processing. The shift processing means executes shift control and generates a shift output according to the shift request to start shifting.

Vehicle required torque calculation processing means (a vehicle required torque calculation processing unit) (not shown) included in the vehicle control device 55 performs vehicle required torque calculation processing. The vehicle required torque calculation processing means reads the vehicle speed V, the accelerator opening degree Ac and the like, and calculates a vehicle required torque TO* that is necessary in order to run the hybrid vehicle.

Next, vehicle required output calculation processing means (a vehicle required output calculation processing unit) (not shown) included in the vehicle control device 55 performs vehicle required output calculation processing. The vehicle required output calculation processing means calculates a driver required output PD by multiplying the vehicle required torque TO* by the vehicle speed V. The vehicle required output calculation processing means also calculates a battery charge/discharge required output PB, based on a battery remaining amount SOC detected by a battery remaining amount sensor (not shown). Further, the vehicle required output calculation processing means calculates a vehicle required output PO by adding the driver required output PD to the battery charge/discharge required output PB.

Subsequently, engine target drive state setting processing means (an engine target drive state setting processing unit) (not shown) included in the vehicle control device 55 performs engine target drive state setting processing. The engine target drive state setting processing means determines a driving point of the engine 11, based on the vehicle required output PO, the accelerator opening degree Ac, and the like. The engine target drive state setting processing means then determines the engine torque TE at the driving point as an engine target torque TE* and also determines the engine rotation speed NE at the driving point as an engine target rotation speed NE*. Further, the engine target drive state setting processing means sends the engine target rotation speed NE* to the engine control device 56.

Start request processing means (a start request processing unit) (not shown) included in the engine control device 56 performs start request processing. The start request processing means judges whether the engine 11 is positioned at a drive area. If the engine 11 is positioned at the drive area but is not being driven, start processing means (a start processing unit) (not shown) included in the engine control device 56 performs start processing and generates an engine start request to start the engine 11. Next, engine start processing means (an engine start processing unit) (not shown) included in the engine control device 56 performs engine start processing and generates an engine start signal when the engine start request has been generated.

Following starting of the engine 11, next, the engine 11 and the motor 25 are driven. Accordingly, the engine torque TE and the motor torque TM are transferred to the driven wheels 39 via the transmission 18, so as to run the hybrid vehicle.

However, while the engine 11 and the motor 25 are driven to run the hybrid vehicle, there may be times, during shifting between predetermined speeds performed by the transmission 18, when the motor rotation speed NM before and after shifting may change. In this situation, the change in the motor rotation speed NM affects a change in the engine rotation speed NE, whereby a shift shock occurs. To cope with this situation, first electric machine control processing means (a first electric machine control processing unit) (not shown), which serves as first electric motor control processing means (a first electric motor control processing unit) included in the generator/motor control device 57, performs first electric machine control processing. Accordingly, the generator rotation speed NG is controlled based on the engine target rotation speed NE*.

In order to make that happen, generator target rotation speed calculation processing means (a generator target rotation speed calculation processing unit) included in the first electric machine control processing means performs generator target rotation speed calculation processing. The generator target rotation speed calculation processing means reads the motor rotation speed NM detected by the rotation speed sensor 49, and calculates a ring gear rotation speed NR1 based on a gear ratio from the transmission shaft 15 to the first ring gear R1. The generator target rotation speed calculation processing means also reads the engine target rotation speed NE* determined in the engine target drive state setting processing, and calculates and determines the generator target rotation speed NG* using a rotation speed relational expression for the planetary gear unit 13, which is based on the ring gear rotation speed NR1 and the engine target rotation speed NE*. Generator torque calculation processing means (a generator torque calculation processing unit) included in the first electric machine control processing means performs generator torque calculation processing. The generator torque calculation processing means reads the generator rotation speed NG detected by the rotation speed sensor 48, executes PI control based on a rotation speed difference ΔNG between the generator rotation speed NG and the generator target rotation speed NG*, and calculates and determines the generator target torque TG*. In this situation, the larger the rotation speed difference ΔNG, the larger the generator target torque TG*. It is also taken into consideration whether the values are positive or negative.

When the generator target torque TG* is calculated in this manner, generator drive processing means (a generator drive processing unit) included in the first electric machine control processing means performs generator drive processing. The generator drive processing means generates an electric current instruction value and a voltage instruction value in accordance with the generator target torque TG*, and drives the generator 16. As a result, it is possible to control the generator rotation speed NG.

However, when the generator rotation speed NG is controlled, a change in the engine rotation speed NE due to an inertia Ig of the generator 16 itself and a control delay leads to the generation of an inertia torque TIe in the engine 11, which corresponds to the amount of change in the engine rotation speed NE. Consequently, a shift shock occurs that may give the driver a sense of discomfort.

In addition, a change in the driving force of the hybrid vehicle resulting from a change in the engine rotation speed may also feel strange to the driver.

To cope with this situation, the first electric machine control processing means controls the generator 16 so that the change in the engine rotation speed NE is suppressed, in correspondence with the inertia Ig.

Figure 6:
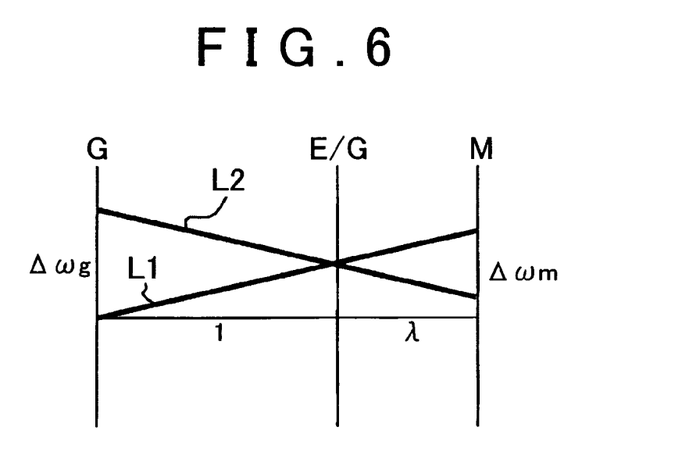
FIG. 6 is a drawing that shows an example of a change in the velocity diagram when shifting is performed according to the embodiment of the present invention.

FIG. 6 is a drawing that shows an example of a change in the velocity diagram when shifting is performed according to the embodiment of the present invention.

For example, as shown in the drawing, when the transmission performs shifting, the velocity diagram changes from a pre-shift state indicated by a line L1 to a post-shift state indicated by a line L2. In this situation, when the rotation speed of the transmission shaft 15 becomes lower, the motor rotation speed NM becomes lower by Δωm. At this time, if the engine rotation speed NE changes due to the change in the motor rotation speed NM, a shift shock will occur. To cope with this situation, the generator rotation speed NG is made higher by $\Delta\omega g$ so that the engine rotation speed NE does not change before and after shifting.

However, when the generator rotation speed NG is controlled, if it is not possible to make the generator rotation speed NG higher by $\Delta\omega g$ because of the inertia Ig of the generator 16 itself or a control delay, the engine rotation speed NE becomes lower by a corresponding amount. Thus, the inertia torque TIe is generated in the engine 11 in correspondence with the amount of change in the engine rotation speed NE. Consequently, a shift shock occurs that may give the driver a sense of discomfort.

In addition, a change in the driving force of the hybrid vehicle resulting from a change in the engine rotation speed NE may also feel strange to the driver.

When a shift request is generated, the shift processing means generates a shift output and starts the shift control. The shift request and the shift output structure a shift start indicator based on which the transmission 18 starts the shift control.

Subsequently, compensating torque calculation processing means (a compensating torque calculation processing unit) included in the first electric machine control processing means performs compensating torque calculation processing. The compensating torque calculation processing means calculates an inertia compensating torque Tgi for the generator 16 that compensates the change in the engine rotation speed NE caused by the inertia Ig from shifting, based on an angular acceleration $\alpha g$ and the inertia Ig of the generator 16. In order to achieve this, the compensating torque calculation processing means calculates the angular accelerations $\alpha g$ and $\alpha m$ as shown below.

$$\alpha g = \Delta\omega g/\Delta t$$

$$\alpha m = \Delta\omega m/\Delta t$$

where, $\Delta t$ denotes the control cycle of a CPU included in the generator/motor control device 57, and $\alpha m$ denotes the angular acceleration of the motor 25. Further, if the ratio of the number of teeth in the first sun gear S1 to the number of teeth in the first ring gear R1 is expressed as $\lambda$, the following expression is satisfied.

$$\alpha m : \alpha g = \lambda : 1$$

Thus, it is possible to express the angular acceleration $\alpha g$, using the ratio $\lambda$ and the angular acceleration $\alpha m$ as shown below.

$$\alpha g = 1/\lambda \cdot \alpha m$$

Thus, it is possible to express the inertia compensating torque Tgi as follows.

$$Tgi = Ig \cdot \alpha g$$
$$= Ig/\lambda \cdot \alpha m$$

Next, target torque correction processing means (a target torque correction processing unit) included in the first electric machine control processing means performs target torque correction processing. The target torque correction processing means reads the generator target torque TG* and corrects the read generator target torque TG* in accordance with the inertia compensating torque Tgi. Thus, according to the present embodiment, when the target torque correction processing means uses the generator target torque TG* to create a corrected generator target torque TG*' that serves as a corrected target torque, the following expression is satisfied.

$$TG^{*'} = TG^{*} + Tgi$$

Consequently, the generator drive processing means generates the electric current instruction value and the voltage instruction value according to the corrected generator target torque TG*' and drives the generator 16. As a result, it is possible to prevent the situation where the engine rotation speed NE changes because of the inertia Ig and the control delay. It is also possible to prevent the inertia torque TIe from being generated in the engine 11. Thus, the engine torque TE can be kept constant. Further, the occurrence of shift shock can be prevented in order to avoid giving the driver a sense of discomfort.

In addition, it is possible to prevent the driving force of the hybrid vehicle from changing so that the driver does not feel unease as a result.

The shift control is executed as explained above. Subsequently, the shift processing means reads the motor rotation speed NM, calculates a changing rate of the motor rotation speed NM, and judges whether the shift process has ended, based on whether the changing rate is smaller than a threshold value. When the shift process ends, the shift processing means ends the shift control.

As explained earlier, control of the generator rotation speed NG is accompanied by changes in respective electric power consumptions PG, PM of the generator 16 and the motor 25. Therefore, the balance of electric power between the generator 16 and the motor 25 becomes disrupted. If a total electric power consumption PT obtained by adding together the electric power consumption PG of the generator 16 and the electric power consumption PM of the motor 25 is a positive value, then there is insufficient electric power created by an electrical system formed from the generator 16 and the motor 25. As a consequence, the deficient electric power is supplied by the battery 46, thereby worsening fuel efficiency.

Hence, while shifting is performed, second electric machine control processing means (a second electric machine control processing unit), which serves as electric power adjustment processing means (an electric power adjustment processing unit) (not shown) of the generator/motor control device 57 and as second electric motor control processing means (a second electric motor control processing unit), performs second electric machine control processing that serves as electric power adjustment processing. The second electric machine control processing means adjusts the electric power consumptions PG, PM. In other words, if the generator 16 is generating electricity while shifting is performed, then the second electric machine control processing means powers and drives the motor 25 by an amount corresponding to a negative electric power consumption PG generated in the generator 16. Thus, a positive electric power consumption PM is generated and electric power is consumed in the motor 25. However, if the generator 16 is being powered and driven, then the motor 25 is regenerated and driven by an amount corresponding to a positive electric power consumption PG generated in the generator 16. Thus, a negative electric power consumption PM is generated and a regenerative electric current is generated by the motor 25.

For this reason, the second electric machine control processing means reads electric currents ig, im detected by the electric current sensors 43, 45. An electric current additional value it is obtained by adding together the electric current ig and the electric current im.

$$it = ig + im$$

The electric current im is generated such that the value it becomes zero, and is supplied to the motor 25 as output.

Accordingly, a balance of electric power between the generator 16 and the motor 25 can be achieved, and the total electric power consumption PT obtained by adding together the electric power consumption PG of the generator 16 and the electric power consumption PM of the motor 25 can be set to zero. As a result, there is no longer any need to supply electric power from the battery 46 to the generator 16 and the motor 25, thus improving the fuel efficiency of the hybrid vehicle.

According to the present embodiment, the electric current im equivalent to the electric current ig is generated. However, the second electric machine control processing means may also read the electric currents ig, im and the battery voltage Vb detected by the battery voltage sensor 47. The electric power consumptions PG, PM is then be calculated as $$PG = ig \cdot Vb$$

$$PM = im \cdot Vb$$

whereby the electric current im can be generated such that the total electric power consumption PT becomes zero.

In the present embodiment, the total electric power consumption PT is set so as to reach zero. However, if the total electric power consumption PT is a negative value, then there is excessive electric power in the electrical system formed from the generator 16 and the motor 25. In such case, the excessive amount of electric power is supplied to the battery 46 and the fuel efficiency is not worsened. Hence, a balance of electric power between the generator 16 and the motor 25 need only be achieved when the total electric power consumption PT is a positive value.

For this reason, the second electric machine control processing means reads the electric currents ig, im and judges whether the electric current additional value it is a positive value. If the electric current additional value it is a positive value, then the electric current im is generated and supplied to the motor 25 such that the electric current additional value it becomes zero. In addition, the second electric machine control processing means may also generate the electric current im such that the electric current additional value it becomes zero or a negative value.

As explained above, in the present embodiment, the total electric power consumption PT is set so as to reach zero. However, if the total electric power consumption PT is a negative value, then there is excessive electric power in the electrical system formed from the generator 16 and the motor 25, although the fuel efficiency is not worsened. Therefore, the total electric power consumption PT may also be set so as to achieve a predetermined negative value.

Next, the flowchart will be explained.

Step S1: It is judged whether a shift request is generated. If a shift request has been generated, the procedure proceeds to step S2. If no shift request has been generated, the procedure returns to the start.

Step S2: Shifting is started.

Step S3: The inertia compensating torque Tgi of the generator 16 is calculated.

Step S4: The generator rotation speed NG is controlled so that the engine rotation speed NE is constant.

Step S5: The electric current ig flowing in the generator 16 is detected.

Step S6: The electric current im flowing in the motor 25 is controlled.

Step S7: Shifting is ended, and the procedure returns to the start.

Figure 7:
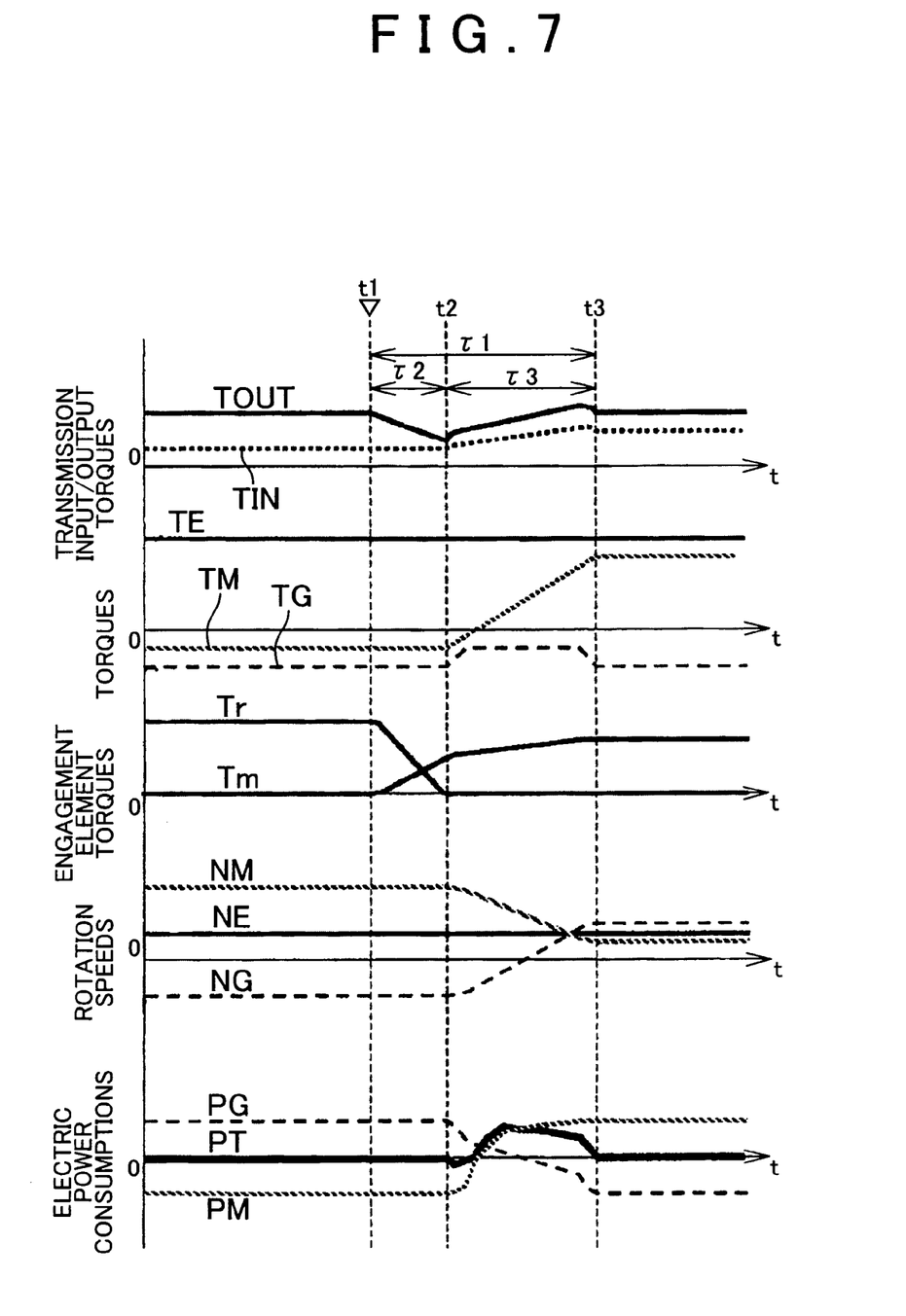
FIG. 7 is a time chart that shows an operation of the vehicle driving apparatus when there is no adjustment of electric power consumption.
Figure 8:
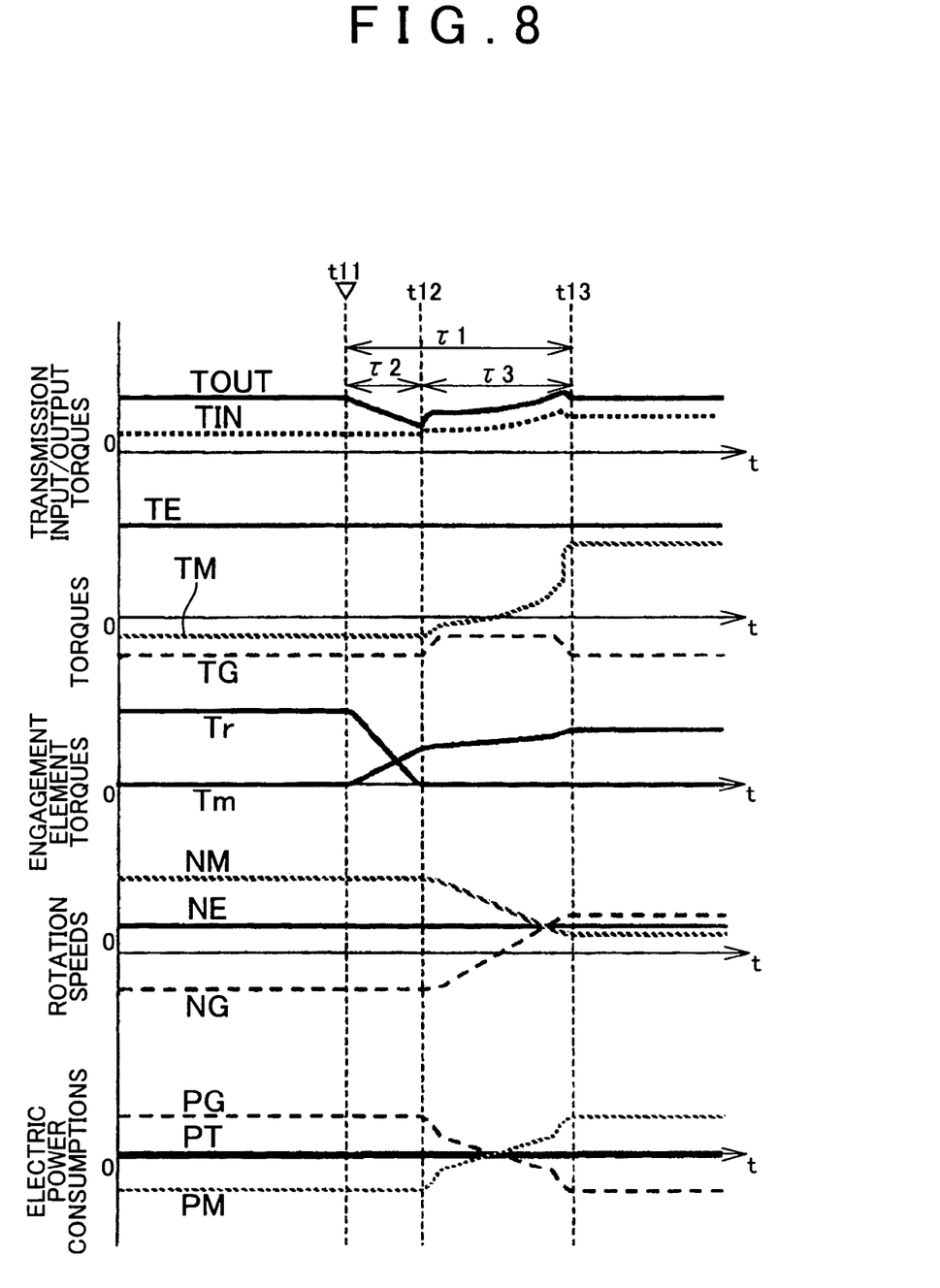
FIG. 8 is a time chart that shows an operation of the vehicle driving apparatus according to the embodiment of the present invention.

Next, operations of the vehicle driving apparatus 10 in cases where the electric power consumptions PG, PM are and are not adjusted will be explained.

FIG. 7 is a time chart that shows an operation of the vehicle driving apparatus when there is no adjustment of electric power consumption. FIG. 8 is a time chart that shows an operation of the vehicle driving apparatus according to the embodiment of the present invention.

In the drawings, reference character τ1 denotes a section from the time when shifting is started and to the time when shifting is ended. Reference character τ2 denotes a torque phase that is a section where the clutches C0 (FIG. 2) to C2 and the brakes B1 and B2 are engaged and disengaged after shifting is started, and the rotation speed of a rotation to be input to the transmission 18 does not change. Reference character τ3 denotes an inertia phase that is a section where the clutches C0 to C2 and the brakes B1 and B2 are engaged and disengaged, and the rotation speed of a rotation to be input to the transmission 18 changes.

Shown in the drawings are: an output torque TOUT that is output to the output shaft 19 while shifting is performed; an input torque TIN that is input to the transmission 18; torques that include the engine torque TE, the generator torque TG, and the motor torque TM; engagement element torques that include an engagement-side torque Tm of the friction engagement element engaged while shifting is performed and a release-side torque Tr of the friction engagement element released while shifting is performed; rotation speeds that include the engine rotation speed NE, the generator rotation speed NG, and the motor rotation speed NM; an electric power consumption PG of the generator 16; an electric power consumption PM of the motor 25; and a total electric power consumption PT obtained by adding the electric power consumptions PG and PM together.

In FIG. 7, at a timing t1, a shift output is generated. Shifting is thus started, and the torque phase τ2 starts. In the torque phase τ2, the engagement-side torque Tm becomes larger, whereas the release-side torque Tr becomes smaller, and the torques are distributed. In this situation, the engine torque TE, the generator torque TG, the motor torque TM, the engine rotation speed NE, the generator rotation speed NG, and the motor rotation speed NM, the electric power consumptions, PG, PM, and the total electric power consumption PT do not change. In addition, the engine torque TE is a positive value; the generator torque TG and the motor torque TM are negative values; the engine rotation speed NE and the motor rotation speed NM are positive values; and the generator rotation speed NG is a negative value. The electric power consumption PG is a positive value; the electric power consumption PM is a negative value; and the total electric power consumption PT is zero.

The torque phase τ2 subsequently ends at a timing t2, and the inertia phase τ3 starts. At a timing t3, the inertia phase τ3 ends. In the inertia phase τ3, the motor torque TM becomes larger and reaches zero, after which it increases in the positive direction. The motor rotation speed NM becomes lower. At this time, the generator rotation speed NG is controlled so that the engine rotation speed NE does not change. Accordingly, the generator rotation speed NG increases in the positive direction and reaches zero, after which it becomes a positive value. This is accompanied by a decrease in the generator torque TG.

In such case, with the increase in the motor torque TM, the electric power consumption PM becomes larger and reaches zero, after which it increases in the positive direction. The generator torque TG is a negative value. Therefore, the generator rotation speed NG increasing from a negative value is accompanied by a decrease in the electric power consumption PG, and after reaching zero, the electric power consumption PG increases in the negative direction. As a result, the total electric power consumption PT is a positive value, and thus disrupts the balance of electric power between the generator 16 and the motor 25.

Meanwhile in FIG. 8, at a timing t11, a shift output is generated. Shifting is thus started, and the torque phase τ2 starts. In the torque phase τ2, the engagement-side torque Tm becomes larger, whereas the release-side torque Tr becomes smaller, and the torques are distributed. In this situation, the engine torque TE, the generator torque TG, the motor torque TM, the engine rotation speed NE, the generator rotation speed NG, and the motor rotation speed NM, the electric power consumptions, PG, PM, and the total electric power consumption PT do not change. In addition, the engine torque TE is a positive value; the generator torque TG and the motor torque TM are negative values; the engine rotation speed NE and the motor rotation speed NM are positive values; and the generator rotation speed NG is a negative value. The electric power consumption PG is a positive value; the electric power consumption PM is a negative value; and the total electric power consumption PT is zero.

The torque phase τ2 subsequently ends at a timing t12, and the inertia phase τ3 starts. At a timing t13, the inertia phase τ3 ends. In the inertia phase τ3, the motor torque TM becomes larger and reaches zero, after which it increases in the positive direction. The motor rotation speed NM becomes lower. At this time, the generator rotation speed NG is controlled so that the engine rotation speed NE does not change. Accordingly, the generator rotation speed NG increases in the positive direction and reaches zero, after which it becomes a positive value.

In such case, with the increase in the motor torque TM, the electric power consumption PM becomes larger and reaches zero, after which it increases in the positive direction. The generator torque TG is a negative value. Therefore, the generator rotation speed NG increasing from a negative value is accompanied by a decrease in the electric power consumption PG, and after reaching zero, the electric power consumption PG increases in the negative direction. Thus, the electric current supplied to the motor 25 is controlled, and the total electric power consumption PT becomes zero. Therefore, a balance of electric power between the generator 16 and the motor 25 can be achieved.

The present invention is not limited to the above embodiment, and may be modified in various forms based on the spirit of the present invention. Such modifications shall be regarded as within the scope of the present invention.

The present invention is applicable to a vehicle driving apparatus for a hybrid vehicle.

According to various exemplary aspects of the invention, the rotation speed of the first electric motor is controlled in conjunction with shifting, and the output supplied to the second electric motor is controlled in conjunction with the control of the rotation speed of the first electric motor. Thus, the electric power consumption generated in the first and second electric motors is adjusted. A balance of electric power between the first and second electric motors can thus be achieved. Accordingly, there is no need to supply an output from a battery to the first and second electric motors, thus improving a fuel efficiency of an electric vehicle.

The invention claimed is:

1. An electric vehicle drive control device, comprising:
   a first electric motor;
   a second electric motor;
   a differential device that includes first, second, and third rotational elements, wherein the first rotational element is connected to the first electric motor, the second rotational element is connected to the second electric motor via a transmission shaft, and the third rotational element is connected to an engine;
   a transmission that shifts a speed of a rotation transferred from the transmission shaft; and
   a controller that:
      controls a rotation speed of the first electric motor so as to suppress a change in an engine rotation speed in conjunction with shifting performed by the transmission; and
      adjusts electric power consumptions generated in the first and second electric motors, by controlling an output supplied to the second electric motor such that a net sum of power being used between the first electric motor and the second electric motor is zero in conjunction with the control of the rotation speed of the first electric motor in an inertia phase in the shifting.

2. The electric vehicle drive control device according to claim 1, wherein the controller controls an output such that the second electric motor is powered and driven when electricity is generated in the first electric motor.

3. The electric vehicle drive control device according to claim 1, wherein the controller controls an output such that regeneration is performed in the second electric motor when the first electric motor is powered and driven.

4. The electric vehicle drive control device according to claim 1, wherein the controller:
   calculates an inertia compensating torque that compensates for a change in rotation speed due to inertia as a result of shifting; and
   corrects a torque, which serves as a target for the first electric motor, in accordance with the inertia compensating torque.

5. The electric vehicle drive control device according to claim 1, wherein
   the differential device is a planetary gear unit formed from a single planetary gear, and
   the transmission is provided with first and second gear units formed from single planetary gears.

6. The electric vehicle drive control device according to claim 1, wherein
   the first electric motor is a generator,
   the second electric motor is a drive motor, and
   in the differential device, the first rotational element is a first sun gear connected to the generator, the second rotational element is a first ring gear connected to the drive motor and the transmission, and the third rotational element is a first carrier connected to the engine.

7. The electric vehicle drive control device according to claim 6, wherein
   the first gear unit in the transmission is provided with a second sun gear, a second ring gear, and a second carrier,
   the second gear unit in the transmission is provided with a third sun gear, a third ring gear, and a third carrier,
   the second sun gear is connected to the first ring gear via a first clutch and connected to a case via a brake,
   the second ring gear is connected to the third carrier and an output shaft,
   the second carrier is connected to the third ring gear, connected to the first ring gear via a second clutch, and connected to the case via a one-way clutch and the brake, and the third sun gear is connected to the first ring gear via a third clutch.

8. A control method for an electric vehicle drive control device comprising a first electric motor; a second electric motor; a differential device that includes first, second, and third rotational elements, wherein the first rotational element is connected to the first electric motor, the second rotational element is connected to the second electric motor via a transmission shaft, and the third rotational element is connected to an engine; and a transmission that shifts a speed of a rotation transferred from the transmission shaft, comprising:

controlling a rotation speed of the first electric motor so as to suppress a change in an engine rotation speed in conjunction with shifting performed by the transmission; and adjusting electric power consumptions generated in the first and second electric motors, by controlling an output supplied to the second electric motor such that a net sum of power being used between the first electric motor and the second electric motor is zero in conjunction with the control of the rotation speed of the first electric motor in an inertia phase in the shifting.

9. The method according to claim 8, wherein the rotation speed of the first electric motor is controlled so as to suppress a change in an engine rotation speed.

10. The method according to claim 8, wherein an output is controlled such that the second electric motor is powered and driven when electricity is generated in the first electric motor.

11. The method according to claim 8, wherein an output is controlled such that regeneration is performed in the second electric motor when the first electric motor is powered and driven.

12. The method according to claim 8, further comprising:

calculating an inertia compensating torque that compensates for a change in rotation speed due to inertia as a result of shifting; and correcting a torque, which serves as a target for the first electric motor, in accordance with the inertia compensating torque.

13. The method according to claim 9, wherein an output is controlled such that the second electric motor is powered and driven when electricity is generated in the first electric motor.

14. The method according to claim 9, wherein an output is controlled such that regeneration is performed in the second electric motor when the first electric motor is powered and driven.

* * * * *